July 6, 1948.    H. J. LAWRENCE ET AL    2,444,570
DRIVE FOR COUNTER NUMERAL WHEELS
Filed Aug. 23, 1946
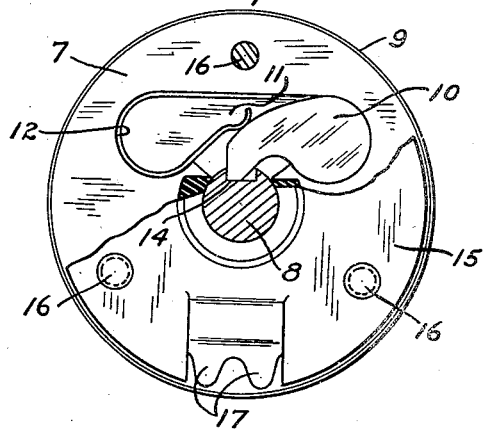
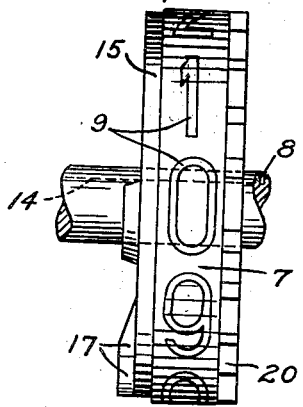
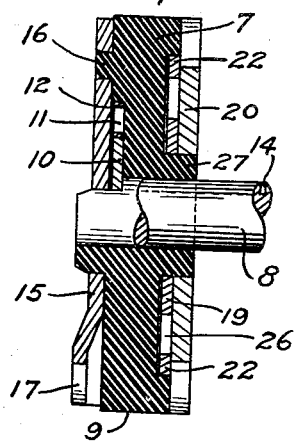
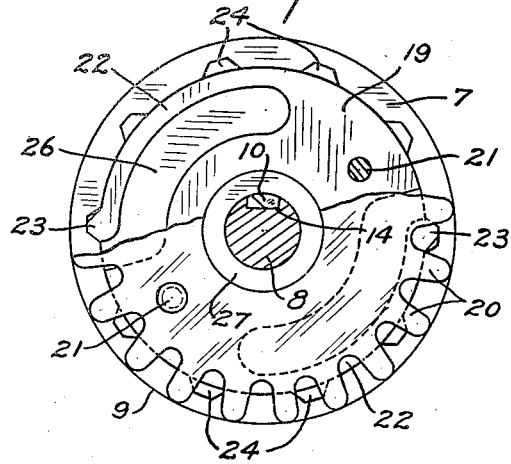
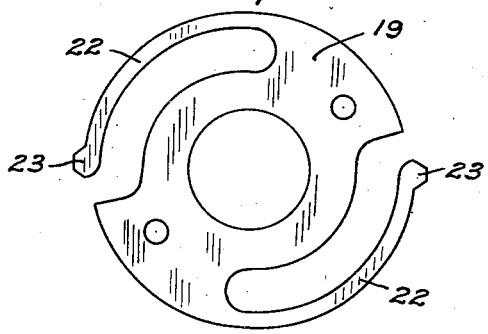
INVENTORS
H. J. Lawrence
BY M. M. Hennessy
Lieber & Lieber
ATTORNEYS.

Patented July 6, 1948

2,444,570

UNITED STATES PATENT OFFICE 2,444,570

DRIVE FOR COUNTER NUMERAL WHEELS

Harold J. Lawrence and Mark M. Hennessy, Milwaukee, Wis., assignors to Durant Manufacturing Co., Milwaukee, Wis., a corporation of Wisconsin Application August 23, 1946, Serial No. 692,406

4 Claims. (Cl. 235—1)

Our present invention relates to improvements in the art of transmitting rotary motion from one element to another, and relates more specifically to improvements in the construction and operation of ratchet drives for positively transmitting rotary motion from a driving to a driven member in one direction while permitting relative reverse rotation of the members.

The primary object of the invention is to provide an improved positive drive assembly for transmitting rotary motion from a driving member such as a gear wheel to a driven member such as a counter numeral wheel, which is simple and durable in construction and highly efficient in operation, and which will permit ready resetting of the numeral wheel to a desired initial position.

In the manufacture of counters for registering or indicating a succession or number of operations of a machine, occurrences of events, or the like, it has long been customary to utilize one-way drives of the pawl and ratchet type between each of the successive driving gears and the adjacent numeral or indexing wheels, in order to permit rapid resetting of the wheels to zero or initial starting position. These prior pawl and ratchet drives embodied several small pawls pivotally suspended from their driving and carrying gears, and which were urged by separate springs into ratchet notches formed within the peripheral rims of the adjacent numeral wheels. Because of the relatively small sizes of these driving gears and numeral wheels, it was necessary in these prior counter assemblages to utilize relatively frail pawls, pivot pins, and springs, all of which were difficult to manufacture and to assemble, and which frequently broke or became displaced and thus interfered with continued and proper functioning of the mechanisms.

It is therefore a more specific object of our present invention to provide an improved one-way drive for such counter numeral wheels or the like, which besides being simpler and stronger than the prior mechanisms of this general type, may also be more conveniently manufactured and assembled.

Another specific object of this invention is to provide an improved pawl and ratchet wheel drive wherein several pawls coacting with a common annular series of ratchet notches formed within the periphery of a wheel, are formed integral with each other and from durable resilient material, so that they may be conveniently applied and utilized in small and compact assemblages.

Still another specific object of the invention is to provide an improved counter number wheel drive wherein relatively few sturdy parts are utilized to provide a rugged driving assemblage adapted to be concealed and confined within extremely limited space, and which will facilitate resetting of the numeral wheels to zero or any other initial starting position.

A further specific object of our invention is to provide an improved indicating or counter wheel unit which may be manufactured and sold at moderate cost, and which embodies a driving gear and number wheel assemblage of durable and reliable construction devoid of separate pawls, pivot pins and loose springs.

These and other specific objects and advantages of the invention will be apparent from the following detailed description.

A clear conception of the features constituting our present improvement, and of the mode of constructing and operating counter numeral wheel drives embodying the invention, may be had by referring to the drawing accompanying and forming a part of this specification wherein like reference characters designate the same and similar parts in the various views.

Fig. 1 is a relatively large side view of a counter numeral wheel and drive assembly, having a portion of the Geneva gear side plate broken away to reveal the reset pawl coacting with the main shaft which is shown in section;

Fig. 2 is a similarly enlarged front elevation of the same counter numeral wheel and driving unit, showing a fragment of the carrier shaft;

Fig. 3 is a central vertical section through the same enlarged assembly or unit;

Fig. 4 is an opposite side view of the relatively large assemblage, having a portion of the driving gear broken away so as to reveal the resilient pawl spider, and the reset shaft being shown in section; and Fig. 5 is a similarly enlarged side view of one of the improved pawl spiders, showing the same removed from the unit.

While the invention has been shown and described herein as being especially useful and advantageously applicable to drives for relatively small counter number or numeral wheels which have ratchet mechanisms housed within the wheels and wherein the wheels are normally operable in series and are adapted to be simultaneously reset, it is not our desire or intention to thereby unnecessarily limit the scope or the utility of the improved features.

Referring to the drawing, the improved counter numeral wheel drive shown therein in relatively large dimensions, comprises in general an indicia bearing or numeral wheel 7 normally carried by a reset shaft 8 and having a series of ten equally spaced numbers or indicia 9 upon its peripheral surface; a reset pawl 10 swingably confined within a pocket 11 formed in one side of the wheel 7 and being constantly urged by a leaf spring 12, toward a longitudinal recess or groove 14 formed in the carrier shaft 8; a Geneva transfer disc or gear plate 15 secured to the wheel 7 by lugs 16 and normally enclosing the pocket 11, the plate 15 being provided with integral peripheral gear teeth 17; and a pawl spider 19 firmly secured to a driving member or gear 20 by means of rivets 21 and having a pair of integral resilient arms 22 each provided with a radially movable pawl 23 adapted to coact with an annular series of ratchet notches 24 formed in the inner rim portion of the wheel 7 within a second pocket 26 at the opposite side of the numeral wheel and in which the spider 19 is normally confined, the spider and its carrying gear 20 being bored for rotary coaction with a hub 27 formed integral with the wheel 7 and embracing the shaft 8.

The numeral wheels 7 may be constructed of any suitable material such as hard rubber or plastic, with the lugs 16 and hubs 27 formed integral with the wheel bodies, and the indicia 9 may be applied in any desired color ordinarily appearing upon white backgrounds. There may be any number of these wheels 7 applied successively or in series to a common carrier or reset shaft 8; and the omitted mechanisms for transferring rotary motion from the wheels of lower order to the adjacent wheels of higher order, and for actuating the shaft 8 to reset all of the wheels 7 to zero or initial starting position, are well known to those familiar with the art, and constitute no part of our present invention. The annular series of internal notches 24 may also be formed directly in the wheel rims, and the pockets 11, 26 are relatively shallow being shaped as clearly shown in Figs. 1, 3 and 4.

The transfer disc or gear plate 15 and the reset pawl 10 may be constructed of durable sheet metal with the aid of punches and dies, and the plate 15 is firmly secured to the adjacent wheel 7 by means of the rivet lugs 16 so as to enclose the pocket 11 and to retain the reset pawl 10 and its actuating spring 12 in proper position. The teeth 17 are formed integral with the locking disc or plate 15 and cooperate with the usual Geneva mechanism to intermittently transfer motion to the adjacent counter wheel unit, and to lock the discs 15 and wheels 7 against undesirable reverse rotation during normal operation. The pawls 10 are adapted to engage the shaft groove or recess 14 in the manner shown in Fig. 1, so as to positively prevent rotation of the wheels 7 in a counter-clockwise direction relative to the shaft 8 when the pawls are disposed within the groove, but permitting relative rotation of these elements in the opposite direction.

The pawl spider 19 which constitutes an important feature of the present invention, is preferably formed of durable resilient sheet-metal such as Phosphor bronze, and the oppositely disposed integral resilient arcuate arms 22 of the spider, are biased outwardly as shown in Fig. 5 and are formed to swing the pawls 23 carried by the free ends of these arms, radially away from the center of the spider. These spiders 19 and their supporting and driving gears 20 may be formed of sheet material with the aid of punches and dies, and each spider 19 is firmly secured to the adjacent gear 20 by means of rivets 21 or otherwise, so as to cause the connected elements to rotate in unison about the counter wheel hub 27. The formation of the pawls 23 and of the notches 24 is such that the wheel 7 may be rotated relative to the spider 19 confined therein, in a counter-clockwise direction as viewed in Fig. 4, but not in a clockwise direction; and the spider 19 may be rotated relative to the wheel 7 in a clockwise direction, but not in a counter-clockwise direction.

After the improved counter wheel assemblages have been properly constructed and applied to the carrier shaft 8 in the manner above described, the shaft 8 will normally be fixed against rotation, and intermittent oscillatory or continuous rotary motion is ordinarily applied to the driving gear 20 associated with the unit wheel 7, that is, the wheel 7 of lowest order. When this gear 20 swings in a clockwise direction as viewed in Fig. 4, the pawls 23 will be pushed inwardly and released from the adjacent notches 24 and will ride along the internal surface of the wheel rim until they reach the next set of dimetrically opposite notches 24 whereupon the resilient arms 22 will cause the pawls to snap into these newly presented notches. When the gear 20 is subsequently swung in the opposite or counter-clockwise direction, the wheel 7 will be positively revolved about its supporting shaft 8 by the pawls 23, and the reset pawl 10 will then be pushed out of the recess 14 and will ride over the outer peripheral cylindrical surface of the normally fixed shaft 8.

As the rotary motion of the driving gear 20 continues, the pawls 23 of the spider 19 will advance the successive numerals 9 step-by-step until a count of ten has been reached upon the wheel 7 of lowest order; and the adjoining wheels 7 of next higher order will be likewise advanced step-by-step whenever the adjoining lower order wheels 7 complete each revolution, thus indicating completed counts of tens, hundreds, thousands, and so forth, upon the successive higher order wheels 7 of the series. The reset pawl 10 does not interfere with this free rotation of the several counter wheels 7 in a counter-clockwise direction as viewed in Fig. 4, and the pawl 10 merely clicks into and out of the groove 14 when passing the same; but when it becomes desirable to reset the counter assemblage to zero or starting position, it is only necessary to bodily rotate the reset shaft 8 in a counter-clockwise direction as viewed in Fig. 4 or in a clockwise direction as viewed in Fig. 1, whereupon the pawls 10 will engage the shaft recess 14 and will thus cause all of the wheels 7 to return to zero or initial setting.

During this resetting operation, all of the driving gears 20 and the pawl spiders 19 of the several counter wheel units will be fixed against rotation, and the notches 24 of the revolving wheels 7 will click past the stationary pawls 23 by virtue of the formation of these pawls and their carrier arms 22. It is to be noted that the surfaces of the pawls 23 remote from the arms 22 are more steeply inclined than those directly adjacent to these arms, while the corresponding surfaces of each ratchet notch 24 are both inclined at the same angle but in opposite directions, and it is this formation of the pawls and notches combined with the arcuate outward curvature of the resilient arms 22, that causes the pawls 23 to positively rotate the adjacent wheels 7 when the pawls are revolved in one direction, and also permits the wheels 7 to be revolved freely past the pawls 23 in the same direction when the latter are held stationary.

From the foregoing detailed description of the construction and operation of the device, it will be apparent that our present invention provides an improved drive for counter numeral wheels or the like, which is exceedingly simple, compact and durable in construction while also being highly efficient and reliable in operation. The invention obviously provides a simplified unidirectional positive drive coupling especially adapted for use in driving the numeral or indexing wheels 7 of a counter, and which may be quickly and conveniently released without difficulty to permit resetting of the wheels to zero or initial starting point. The improved drive comprises relatively few sturdy parts which may be readily manufactured and assembled at low cost, to provide a rugged assemblage adapted to be built in small and diverse sizes. While it is only necessary to provide a single resilient arm 22 and pawl 23 on each of the spiders 19, it is preferable to utilize several of these arms and pawls spaced equidistant about the central axis of the spider in order to prevent undesirable and unbalanced side thrust on the hub 27. The pawl and ratchet mechanism is also extremely compact and devoid of parts which are liable to become loose or displaced, thereby insuring long life and continued efficient functioning of the drive; and the improved driving assemblages have proven highly satisfactory and successful in actual use.

It should be understood that it is not desired to limit this invention to the exact details of construction or to the precise mode of operation, herein shown and described, for various modifications within the scope of the appended claims may occur to persons skilled in the art. While the improvement is especially advantageous for use in counter numeral wheel units, it may also be utilized in other assemblages involving similar operating conditions, without departing from the contemplated scope of the claims.

We claim:

1. In a counter, a numeral wheel having an annular series of equally spaced internal ratchet notches within its peripheral rim and surrounding its central axis, and a unitary spider oscillatable about said axis to intermittently rotate the wheel, said spider having a pair of diametrically opposite integral resilient arms each provided with an integral pawl projecting away from the central axis and movable radially of said axis into and out of the successive notches of said series.

2. In a counter, a numeral wheel having a central hub and a pocket in one side thereof and also having an annular series of internal peripheral notches surrounding the hub, and a unitary spider confined within said pocket and surrounding said hub, said spider having an arcuate integral arm extending circumferentially relative to the hub and provided with an integral pawl at its free end projecting away from the spider axis and movable radially into the successive notches of said series by the arm.

3. In a counter, a numeral wheel having a shallow annular side pocket provided with a central hub and with a peripheral rim surrounding said hub and having therein an annular series of internal ratchet notches surrounding the hub axis, a unitary spider disposed entirely within said pocket and having a central bore journalled upon said hub and a pair of integral arms extending circumferentially relative to the hub and each provided with an integral pawl at its free end projecting away from said axis and movable radially into the successive notches of said series, and a gear secured to said spider and enclosing said pocket.

4. In a counter, a numeral wheel having an annular series of peripheral symmetrical V-notches, and a unitary spider having a portion surrounding the central axis of said wheel and being provided with a pair of diametrically opposite integral arcuate arms disposed circumferentially relative to said axis and each carrying an integral V-shaped pawl at its free end movable radially into and out of said notches, each pawl having one surface remote from its carrying arm inclined at the same angle as that of the symmetrical notch surface of coaction so as to positively prevent relative rotation of the wheel and spider in one direction, and each pawl also having an opposite surface adjacent to its carrying arm inclined at a lesser angle in order to permit relative rotation of the wheel and spider in the opposite direction.

HAROLD J. LAWRENCE.
MARK M. HENNESSY.

REFERENCES CITED

The following references are of record in the file of this patent:

UNITED STATES PATENTS

| Number | Name | Date |
| --- | --- | --- |
| 950,546 | Veeder | Mar. 1, 1910 |
| 1,592,568 | Orth | July 13, 1926 |
| 1,995,434 | Overbury | Mar. 26, 1935 |
| 2,004,881 | Slye | June 11, 1935 |
| 2,140,839 | Hennessy | Dec. 20, 1938 |
| 2,173,773 | Aamot et al. | Sept. 19, 1939 |
| 2,342,325 | Bliss | Feb. 22, 1944 |